US010248931B2

(12) United States Patent
Amento et al.

(10) Patent No.: US 10,248,931 B2
(45) Date of Patent: Apr. 2, 2019

(54) COLLABORATIVE ANNOTATION OF MULTIMEDIA CONTENT (75) Inventors: Brian Scott Amento, Morris Plains, NJ (US); Christopher Harrison, Mount Kisco, NY (US); Larry Stead, Upper Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1355 days.

(21) Appl. No.: 12/144,418

(22) Filed: Jun. 23, 2008

(65) Prior Publication Data

US 2009/0319885 A1  Dec. 24, 2009

(51) Int. Cl.
*G06F 17/30* (2006.01)
*G06Q 10/10* (2012.01)
*G06F 17/24* (2006.01)

(52) U.S. Cl.
CPC ........... *G06Q 10/10* (2013.01); *G06F 17/241* (2013.01); *G06F 17/30* (2013.01); *G06F 17/30017* (2013.01); *G06F 17/30038* (2013.01)

(58) Field of Classification Search
CPC ............. G06F 17/241; G06F 17/30017; G06F 17/30038; G06F 17/30
USPC ................................. 715/230, 233, 719, 723
See application file for complete search history.

(56) References Cited

U.S. PATENT DOCUMENTS

| | | | |
|---|---|---|---|
| 6,105,055 A | 8/2000 | Pizano et al. | |
| 6,567,779 B1 | 5/2003 | Basso et al. | |
| 6,687,878 B1 | 2/2004 | Eintracht et al. | |
| 6,862,569 B1 | 3/2005 | Basso et al. | |
| 7,076,417 B2 | 7/2006 | Jain et al. | |
| 7,076,426 B1 | 7/2006 | Beutnagel et al. | |
| 7,110,950 B2 | 9/2006 | Basso et al. | |
| 7,203,924 B2 | 4/2007 | Rehof et al. | |
| 7,954,049 B2 * | 5/2011 | Fletcher et al. | ............... 715/231 |
| 2002/0110226 A1 | 8/2002 | Kovales | |
| 2003/0005181 A1 | 1/2003 | David et al. | |
| 2003/0016951 A1 | 1/2003 | Jakel et al. | |
| 2003/0023679 A1 | 1/2003 | Johnson et al. | |
| 2003/0046044 A1 | 3/2003 | Jain et al. | |
| 2003/0158816 A1 | 8/2003 | Rouse | |
| 2003/0204570 A1 | 10/2003 | Rehof et al. | |
| 2004/0139047 A1 | 7/2004 | Rechsteiner et al. | |
| 2004/0169683 A1 | 9/2004 | Chiu et al. | |

(Continued)

*Primary Examiner* — Amy Ng
*Assistant Examiner* — Sajeda Muhebbullah
(74) *Attorney, Agent, or Firm* — Jackson Walker L.L.P.

(57) ABSTRACT

A method for collaborative annotating of a program of multimedia content includes enabling a first user to create a program annotation, enabling the first user to store annotation data, and enabling a second user to access the annotation data. The second user may navigate the program using the annotation and/or view the annotation while viewing the program. The first user may create the annotation while viewing the program, for example, by asserting an annotation button on a remote control device. The annotation may include the frame that was displayed when the user created the annotation, text, audio, an image, or video selected by the viewer. The annotations include chronological information indicative of a chronological location of the annotation within the program. The annotations may include "rating annotations" indicating the author's subjective rating of a portion of the program that is in chronological proximity to the annotation's chronological location.

19 Claims, 8 Drawing Sheets (56) References Cited

U.S. PATENT DOCUMENTS

| | | |
|---|---|---|
| 2004/0223737 A1 | 11/2004 | Johnson |
| 2005/0008261 A1 | 1/2005 | Wolff et al. |
| 2005/0038794 A1 | 2/2005 | Piersol |
| 2005/0119877 A1 | 6/2005 | Basso et al. |
| 2005/0160113 A1* | 7/2005 | Sipusic ................. G06F 3/0485 |
| 2005/0183119 A1 | 8/2005 | Hofrichter et al. |
| 2005/0203927 A1 | 9/2005 | Sull et al. |
| 2005/0210145 A1 | 9/2005 | Kim et al. |
| 2006/0004871 A1* | 1/2006 | Hayama et al. ........... 707/104.1 |
| 2006/0026502 A1* | 2/2006 | Dutta .................... G06Q 10/10 715/230 |
| 2006/0080453 A1 | 4/2006 | Thukral |
| 2007/0100988 A1 | 5/2007 | Johnson et al. |
| 2007/0101374 A1 | 5/2007 | Sherman et al. |
| 2007/0106675 A1 | 5/2007 | Watanabe et al. |
| 2007/0133607 A1 | 6/2007 | Park |
| 2007/0156627 A1 | 7/2007 | D'alicandro |
| 2008/0033790 A1* | 2/2008 | Nickerson ............... G06Q 30/02 705/7.32 |
| 2009/0164904 A1* | 6/2009 | Horowitz .......... G06F 17/30817 715/723 |
| 2009/0187825 A1* | 7/2009 | Sandquist et al. ............ 715/719 |
| 2009/0210779 A1* | 8/2009 | Badoiu et al. ................ 715/230 |
| 2009/0319884 A1 | 12/2009 | Amento et al. |
| 2010/0278453 A1* | 11/2010 | King ............................. 382/321 |

* cited by examiner

COLLABORATIVE ANNOTATION OF MULTIMEDIA CONTENT

BACKGROUND

Field of the Disclosure

The present disclosure relates to multimedia content services including services for delivering and receiving television, video on demand, and pay per view programs.

Description of the Related Art

Historically, all viewers of a television program or other program of multimedia content viewed the program at the same time, at least within a given time zone or geographic region. Increasingly, however, due to the advent of on-demand content and the prevalence of digital video recording functionality, multimedia content is increasingly viewed asynchronously by different viewers.

DESCRIPTION OF THE EMBODIMENT(S)

In one aspect, a disclosed service for enabling collaborative annotating of a program of multimedia content includes enabling a first user to create an annotation for the program, enabling the first user to store annotation data indicative of the annotation, and enabling a second user to access the annotation data. The second user may then navigate the program using the annotation data and/or view the annotation while viewing the program. The first user may be enabled to create the annotation while viewing the program, for example, by asserting an annotation button on a remote control device.

The annotation may include an image indicative of the content or frame that was displayed when the user asserted the annotation button or otherwise created the annotation. The annotation might include information indicative of the annotation's author and annotation content including text, an audio segment, an image, or a video segment selected by the viewer or other author of the annotation. The annotations may be chronologically ordered and might include chronological information indicative of a chronological location of the annotation within the program. The ability to create annotations may include the ability to create "rating annotations" including the annotation author's approval or disapproval and/or a subjective rating of a portion of the program that is in chronological proximity to the chronological location of the annotation.

In another aspect, a disclosed data processing system that is suitable for use in a multimedia content delivery network includes a processor that has access to tangible, computer readable storage, which may be concentrated in a single storage entity or distributed among a plurality of storage entities. The storage includes embedded and executable instructions (software) for collaborative annotation of a multimedia content program.

In some embodiments, the software responds to detecting an annotation request from a first user viewing the program by generating an annotation and storing annotation data that is indicative of the annotation's content, the annotation's chronological information, and the annotation's author. The software recognizes a second user as a member of a collaboration group in response to a collaboration group request from the first viewer. The software provides the annotation to the second user when the second user requests the program for viewing.

The software to generate the annotation may be operable to generate the annotation while the first user is viewing the program. The software may generate annotations when the first user asserts an annotation button on a remote control device. The annotation may include text, an audio segment, an image, and a video segment, or a combination thereof, selected by the first user. The annotations may include chronological information that indicates an annotation's chronological location within the program. In some embodiments, the software to enable the first user to create the annotation includes software for enabling the first user to create a rating annotation that includes the annotation author's approval or disapproval or the author's subjective rating of a portion of the program that is chronologically proximal to the annotation's chronological location.

In still another aspect, a disclosed method supports collaborative annotations for a program of multimedia content. The annotations may be shared by a plurality of users in an annotation group. The method includes storing annotation data indicative of an annotation when a first user of the annotation group annotates the program. The annotation may be associated with a selected chronological location within the program. The annotation may be a chat annotation that includes text selected by the first user, a rating annotation indicating the first user's approval, disapproval, or other subjective rating of the program content in chronological proximity to the annotation, or another type of annotation. The first user may create the annotation by asserting an annotation button on a remote control, via a menu driven interface, or in other ways.

When a second user of the annotation group requests the program, the second user may be provided access to the annotation data. The second user may then use the annotation data to navigate the program based on the annotations. The second user may also play the program with an annotations feature enabled, in which case the second user may be presented with visually detectable information indicative of the annotation while viewing the selected chronological location. If, for example, the annotation is a chat annotation, the annotation may appear on the display screen when the program progresses to the point at which the annotation was created.

In still another aspect, a disclosed collaborative annotation method includes enabling a plurality of users to annotate a program of multimedia content. The annotations correspond to the chronological positions of the program when the annotations are created. The method further includes storing annotation data that describes or otherwise indicates the annotations and enabling at least one of the plurality of users to access the stored annotation data and display the annotations while the program is playing. In some embodiments, the method includes enabling a first user to define the plurality of users who can annotate a program and who have access to the stored annotation data. The method may further include enabling at least one of the plurality of users to navigate the program via the annotations and to send the annotation to a selected recipient for use in viewing the content.

In still another aspect, a disclosed service for enabling enhanced navigation of a program of multimedia content includes enabling a user to access annotation data associated with the program. The annotation data is indicative of a plurality of chronologically ordered annotations generated by one or more viewers of the program. The chronological positioning of an annotation within the program is indicative of the portion of the program being watched when the annotation was created. In other words, the annotations occur at locations in the program when they are created. If a first user creates a first annotation at the seven minute mark of a program, a second user, who watches the program while accessing the stored annotation data, will see the first user's annotation at the seven minute mark of the program.

The method further includes enabling a user to define annotation criteria. The annotation criteria may include an annotation density criterion, an annotation content criterion, another type of criterion, or a combination thereof. Upon identifying a chronological position satisfying the annotation criteria, the method advances the program to the identified chronological position. The method may then play the program from the identified chronological position and display information indicative of chronologically subsequent annotations as the program is playing.

An annotation density criterion may specify a minimum number of annotations within a specified interval of the program. At least some of the annotations may include chat annotations including text generated by the annotation author. The annotation criterion may specify chat annotations. The annotations may include rating annotations indicating an annotation author's approval or disapproval of chronologically proximal content and the annotation criterion may specify the rating annotations. The annotation criteria may specify a density of rating annotations approving or disapproving of the corresponding proximal content or a density of rating annotations approving of the chronologically proximal content occurring simultaneously with a density of rating annotations disapproving of the chronologically proximal content.

In still another aspect, a disclosed data processing system suitable for use in a multimedia content delivery network includes a processor having access to tangible, computer readable storage where the storage includes embedded and executable instructions (software) for navigating a multimedia content program using annotations associated with the program. The software may access annotation data indicative of a plurality of annotations corresponding to the program and enable a user to define annotation criteria. The annotation criteria may include a density criterion specifying an annotation density threshold or a content criterion specifying content characteristic of the annotations. The software may also identify a chronological position within the program wherein the annotation criteria are satisfied and present the viewer or other user with an option to advance the program to the identified chronological position. The software may also play the program from the identified chronological position and display any chronologically subsequent annotations as the program is playing.

In still another aspect, a disclosed method for supporting annotation-based navigation of a program of multimedia content includes responding to a user request for annotation data associated with the program by determining whether the user is authorized to access the annotation data and responding to authorizing the user by enabling the user to access the annotation data. The method further includes enabling the user to define annotation criteria and responding to a request to search the annotation data by identifying a chronological location in the program associated with a set of annotations satisfying the criteria. The method may further include advancing the program to the identified chronological position and/or presenting the user with an option to advance the program to the identified chronological position.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
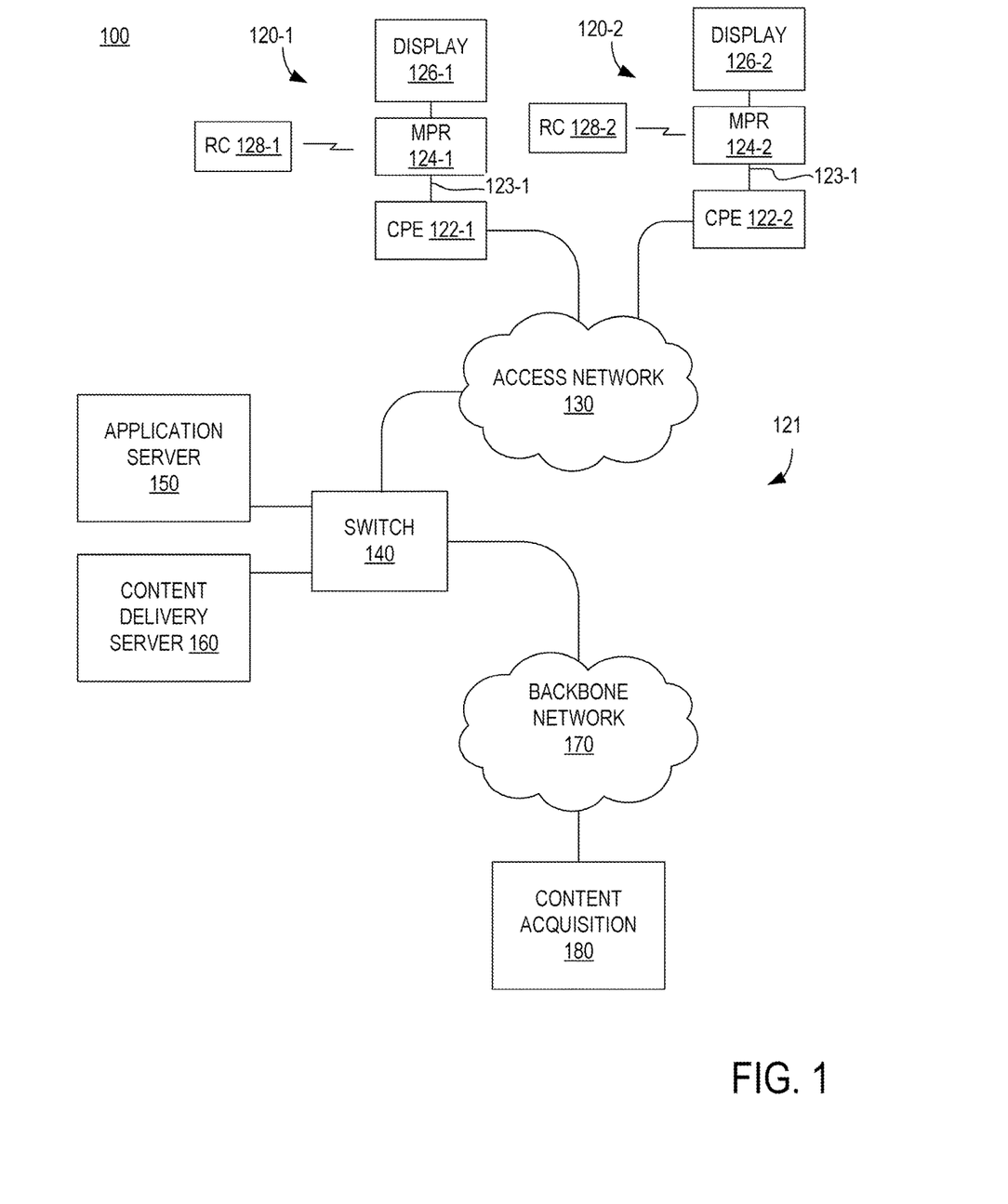
FIG. 1 is a block diagram of selected elements of a multimedia content distribution network.

Turning now to the drawings, FIG. 1 is a block diagram illustrating selected elements of an embodiment of a multimedia content delivery multimedia content delivery network 100. The depicted embodiment of multimedia content delivery multimedia content delivery network 100 includes functionality to facilitate collaborative annotating of a multimedia content stream and enhanced navigation of annotated streams based on the annotations themselves. Although multimedia content is not limited to television, video-on-demand, or pay-per-view programs, the depicted embodiments of multimedia content delivery multimedia content delivery network 100 and its capabilities are described herein with primary reference to these types of multimedia content, which are interchangeably referred to herein as multimedia content program(s), multimedia programs or, simply, programs.

The elements of multimedia content delivery multimedia content delivery network 100 illustrated in FIG. 1 emphasize the network's functionality for delivering multimedia content to one or more subscribers. As depicted in FIG. 1, multimedia content delivery multimedia content delivery network 100 includes one or more clients 120, where each client may represent a different subscriber, and a service provider 121 that encompasses resources to acquire, process, and deliver programs to clients 120. Clients 120 and service provider 121 are demarcated by an access network 130 to which clients 120 and service provider 121 are connected. In some embodiments, access network 130 is an Internet protocol (IP) network, while in other embodiments, access network 130 may be implemented as a conventional coaxial-based network. In IP implementations of access network 130, access network 130 may employ a physical layer of unshielded twist pair cables, fiber optic cables, or both. As an example, multimedia content delivery multimedia content delivery network 100 may employ digital subscribe line (DSL) compliant twisted pair connections between clients 120 and a node (not depicted) in access network 130 while fiber cable or other broadband cable connects service provider resources to a node in access network 130. In other embodiments, the broadband cable may extend all the way to clients 120.

The clients 120 depicted in FIG. 1 include a network appliance identified as customer premises equipment (CPE) 122 that connects to access network 130 and to a multimedia processing resource (MPR) 124. CPE 122 may supply routing, firewall, or other services for clients 120. CPE 122 may include elements of a broadband modem such as an asynchronous DSL (ADSL) modem as well as elements of a local area network (LAN) access point that supports a LAN 123 to which MPR 124 connects. LAN 123 may, in some embodiments, represent an Ethernet compliant LAN, also sometimes referred to as an IEEE 811 LAN. Clients 120 as depicted in FIG. 1 further include a display device or, more simply, a display 126. A remote control 128 of client 120 is operable to communicate wirelessly to MPR 124 using infrared or radio frequency signals as is well known. MPRs 124 may receive input via buttons (not depicted) located on side panels of MPRs 124.

Figure 2:
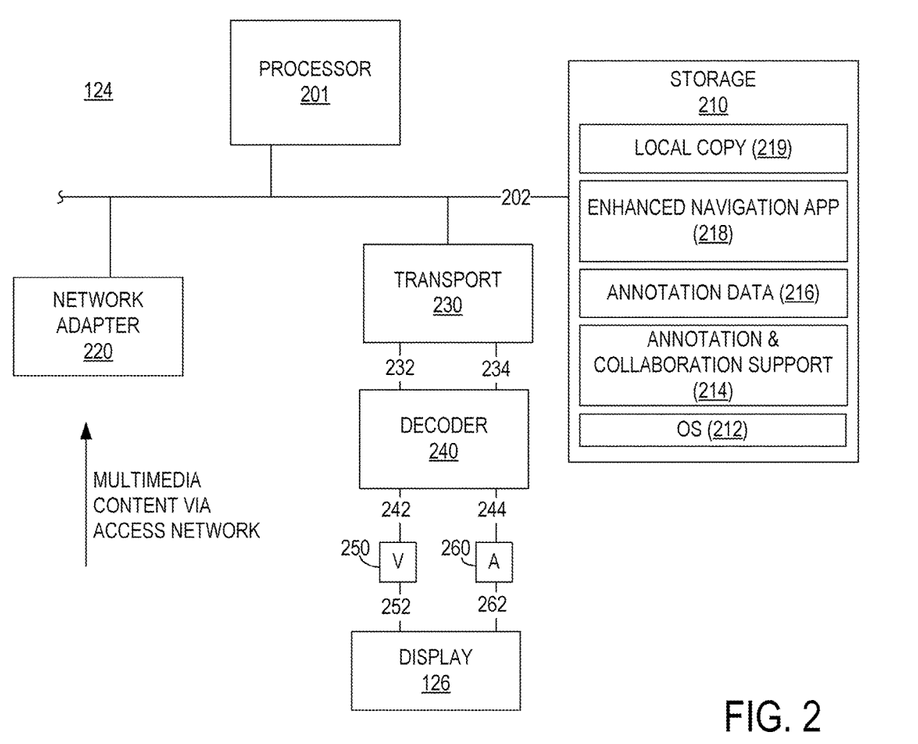
FIG. 2 is a block diagram of selected elements of an embodiment of a multimedia processing resource suitable for supporting a collaborative annotation application.

MPR 124 may be implemented as a stand-alone set top box suitable for use in a co-axial or IP-based multimedia content delivery network. In other embodiments, MPR 124 may be integrated with display 126, CPE 122, or both. Referring to FIG. 2, a block diagram illustrating selected elements of MPR 124 is presented. In the depicted embodiment, MPR 124 includes a processor 201 coupled to storage media collectively identified as storage 210 via a shared bus 202. Storage 210 encompasses persistent and volatile media, fixed and removable media, and magnetic and semiconductor media. Storage 210 is operable to store instructions, data, or both. Storage 210 as shown includes multiple sets or sequences of instructions, namely, an operating system 212, an application program identified as annotation and collaboration support 214, and an application program identified as enhanced navigation application 218.

Operating system 212 may be a Unix® or Unix-like operating system, a Windows® family operating system, or another suitable operating system. Annotation and collaboration support 214, as suggested by its name, may operate in conjunction with an annotation application, which may be hosted on an application server or content delivery server of service provider 121, to facilitate collaborative annotation of a program of multimedia content. Enhanced navigation application 218 may include instructions to implement annotation based navigation of annotated programs and may further include instructions to support criteria based identification of desired locations within an annotated program.

The implementation of MPR 124 depicted in FIG. 2 includes a data structure identified as annotation data 216 and a data structure identified as local copy 219, which represents a copy of the program of multimedia content. Annotation data 216 includes data that represents or is otherwise indicative of annotations created using the collaborative annotation application 330 and annotation and collaboration support 214 described herein. In this embodiment, annotation data 216 is maintained as a data structure that is separate and distinct from the program to which the annotation data corresponds. In this implementation, annotation data 216 may be freely exchanged among users within a defined group independent of the underlying program. Each user may then download or otherwise acquire a resident copy of a program, an example of which is illustrated in FIG. 2 as local copy 219. Thereafter, the annotation may be transferred or accessed as needed to reflect additions or other modifications to the annotation data 216.

MPR 124 as depicted in FIG. 2 further includes a network adapter 220 that interfaces MPR 124 to LAN 123 and through which MPR 124 receives multimedia content. In embodiments suitable for use in IP based content delivery networks, MPR 124, as depicted in FIG. 2, may include a transport unit 230 that assembles the payloads from a sequence or set of network packets into a stream of multimedia content. In coaxial based access networks, content may be delivered as a stream that is not packet based and it may not be necessary in these embodiments to include transport unit 230. In a co-axial implementation, however, clients 120 may require tuning resources (not explicitly depicted in FIG. 1) to "parse" desired content from other content that is delivered over the coaxial medium simultaneously and these tuners may be provided in MPRs 124. The stream of multimedia content received by transport unit 230 may include audio information and video information and transport unit 230 may parse or segregate the two to generate a video stream 232 and an audio stream 234 as shown.

Video and audio streams 232 and 234, as output from transport unit 230, may include audio or video information that is compressed, encrypted, or both. A decoder unit 240 is shown as receiving video and audio streams 232 and 234 and generating native format video and audio streams 242 and 244. Decoder 240 may employ any of various widely distributed video decoding algorithms including any of the Motion Pictures Expert Group (MPEG) standards, Windows Media Video (WMV) standards including WMV 9, which has been standardized as Video Codec-1 (VC-1) by the Society of Motion Picture and Television Engineers. Similarly decoder 240 may employ any of various audio decoding algorithms including Dolby® Digital, Digital Theatre System (DTS) Coherent Acoustics, and Windows Media Audio (WMA).

The native format video and audio streams 242 and 244 as shown in FIG. 2 may be processed by encoders/digital-to-analog converters (encoders/DACs) 250 and 260 respectively to produce analog video and audio signals 252 and 262 in a format compliant with display 126, which itself may not be a part of MPR 124. Display 126 may comply with a National Television Systems Committee (NTSC), Phase Alternating Line (PAL) or any other suitable television standard.

Returning now to FIG. 1, the selected elements representing service provider 121 include content acquisition resources 180 connected to a switch 140 via a backbone network 170. An application server 150 and a content delivery server 160 are also shown connected to switch 140. Switch 140 may provide firewall and routing functions to demarcate access network 130 from the resources of service provider 121. Switch 140 may be housed in a central office or other facility of service provider 121. In embodiments that employ DSL compliant connections, switch 140 may include elements of a DSL Access Multiplexer (DSLAM) that multiplexes many subscriber DSLs to backbone network 170. Backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and video-on-demand content.

Acquired content is provided to a content delivery server 160 via backbone network 170 and switch 140. Content may be delivered from content delivery server 160 to clients 120 via switch 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of multimedia content delivery network 100 may include content acquisition resources in regional offices that are connected to switch 140.

Although the service provider 121 is depicted in FIG. 1 as having a single switch 140 to which content acquisition resources 180, content delivery server 160, and application server 150 are connected, other embodiments may employ different switches for each of these functional components and may include additional functional components not depicted in FIG. 1 including, for example, operational subsystem support (OSS) resources.

FIG. 1 illustrates application server 150 connected to switch 140. As suggested by its name, application server 150 may host or otherwise implement one or more applications for multimedia content delivery network 100. Applications provided by application server 150 may be downloaded and hosted on other network resources including, for example, content delivery server 160, switch 140, CPE 122, and/or MPR 124.

Figure 3:
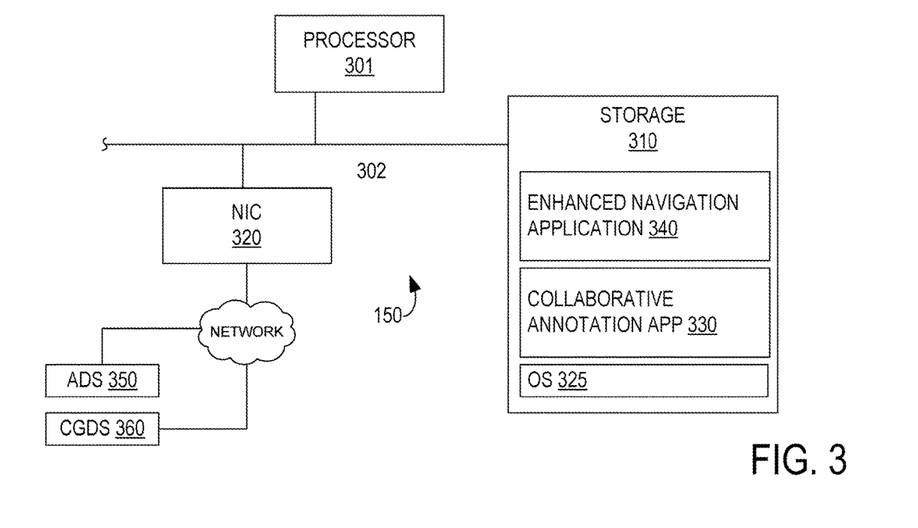
FIG. 3 is a block diagram of selected elements of an embodiment of a server suitable for hosting a collaborative annotation application.

Referring to FIG. 3, a block diagram depicts selected elements of an embodiment of application server 150 including support for collaborative annotation as described herein. In the depicted embodiment, application server 150 includes at least one processor 301 that is operable to access storage 310 via a shared bus 302. A network interface card (NIC) 320 connects to the shared bus 302 and supports communication between processor 310 and network connected resources.

Some embodiments of the multimedia content distribution multimedia content delivery network 100 as described herein include functionality that supports collaborative annotation of multimedia content programs and enhanced, annotation-based navigation of annotated programs.

In the depicted embodiment, storage 310 of application server 150 includes instructions that define an operating system 325, a collaborative annotation application 330, and an enhanced navigation application 340. As depicted in FIG. 3, application server 150 has networked access to remote data structures including an annotation data structure 350 and a collaboration group data structure 360 that may be used in conjunction with collaborative annotation application 330. In other embodiments, the data represented by data structures 350 and/or 360 may be included within storage 310.

Figure 4:
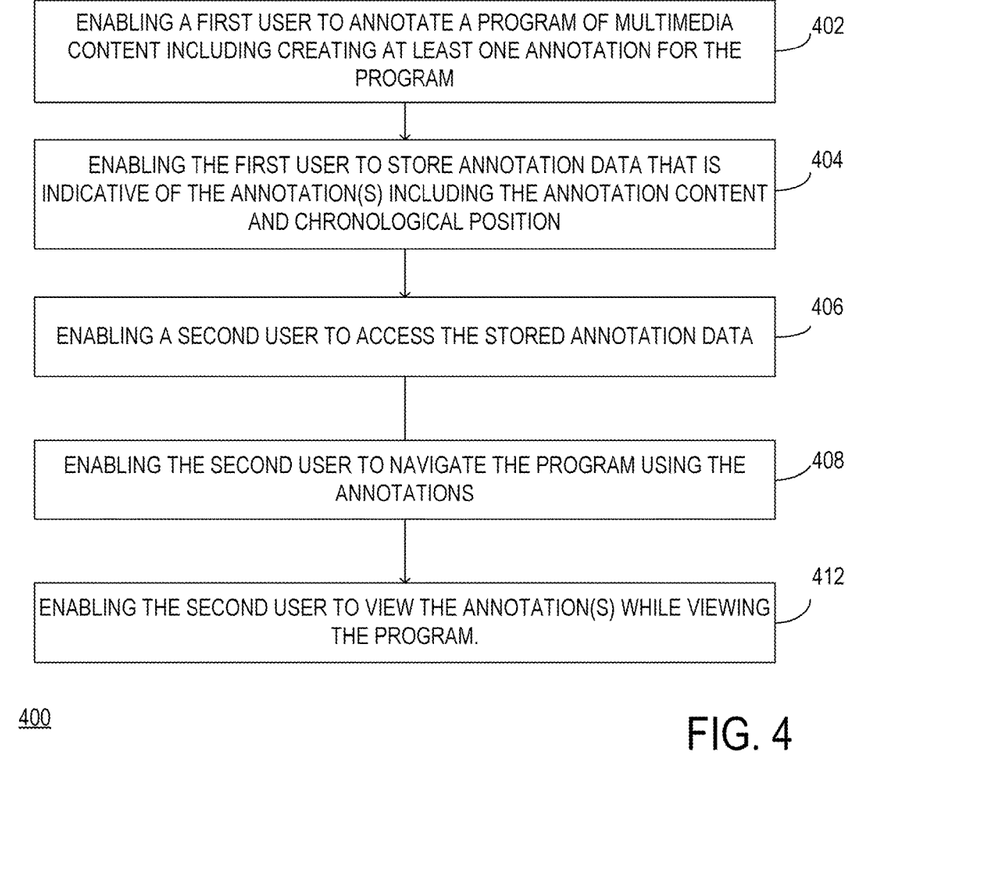
FIG. 4 is a flow diagram of selected elements of an embodiment of a service for providing a collaborative annotation feature.

Turning now to FIG. 4, a flow diagram depicts selected elements of an embodiment of a method 400 for enabling collaborative annotation of multimedia programs. All or portions of method 400 may be included within collaborative annotation application 330 of FIG. 3 and/or annotation and collaboration support 214 of FIG. 2.

As depicted in FIG. 4, method 400 illustrates a method or service for enabling collaborative annotation of multimedia content. In the depicted embodiment, method 400 includes enabling (block 402) a first user to create an annotation for a program of multimedia content.

Enabling the first user to create the annotation may include enabling the first user to create the annotation "on-the-fly," i.e., while the first user is viewing the program. Creating an annotation may, for example, be achieved by asserting an annotation button on a remote control device. The annotation may be a binary button that indicates, for example, a thumbs up or thumbs down evaluation of the corresponding content, i.e., the program content that is being displayed when the annotation is generated.

The annotation may include annotation content and chronological information. The annotation content may include an image indicative of the content displayed when the user asserted the annotation button. For example, the annotation content may include a "screen shot" or an image of the frame that was being displayed when the user asserted the annotation button. The annotation content may also include or include, in the alternative, text, an audio segment, a different image, and a video segment selected by the viewer or other author of the annotation. The chronological information of an annotation may include information indicative of a chronological location within the program of the annotation, i.e., an indication of where in the program the annotation resides chronologically. In some embodiments, the annotations are chronologically ordered.

The depicted embodiment of method 400 further includes enabling (block 404) the first user to store data indicative of the annotation. The first user may be enabled to store the annotation as a data structure that is apart and distinct from the multimedia content to which the annotation data pertains. The first user may be enabled to store the annotation locally, e.g., in storage 210 of MPR 124 or in a networked storage resource including, as an example, storage 310 of application server 150.

An annotation may include a screen shot or other image indicative of the content, i.e., the portion of the program, that was displayed when the annotation button was asserted or when the annotation creation process was imitated in any other way.

Enabling the first user to create an annotation might further include a subjective rating of a portion of the program that is in chronological proximity or otherwise close in time to the chronological location of the annotation. For example, multimedia content delivery network 100 may support "up/down" annotations that convey a user's subjective approval or rating of a portion of a program. These up/down annotations might be presented as an up/down icon or other image. For example, an up/down rating icon might appear as a human hand giving a "thumbs up" or "thumbs down" signal.

Method 400 as depicted further includes enabling (block 406) a second user to access the annotation data and to perform any of several acts including, as examples, navigating (block 408) the program using the annotation data or viewing (block 412) the annotation while viewing the program. In some embodiments, a group of two or more users are associated with one another for purposes of sharing annotations. In these embodiments, the annotations associated with a particular program may be incorporated into a single annotation data structure that represents all annotations created by any of the users in the user group. In these embodiments, any of the users may then access the annotation data and interact with it. In other embodiments, the annotation data may include two or more annotation data structures. For example, the annotation data may include separate data structures for each user in the group. Whether annotation data is contained in a signal data structure or not, a user who accesses the annotation data may have the ability to identify the users whose annotations are of interest.

Figure 5:
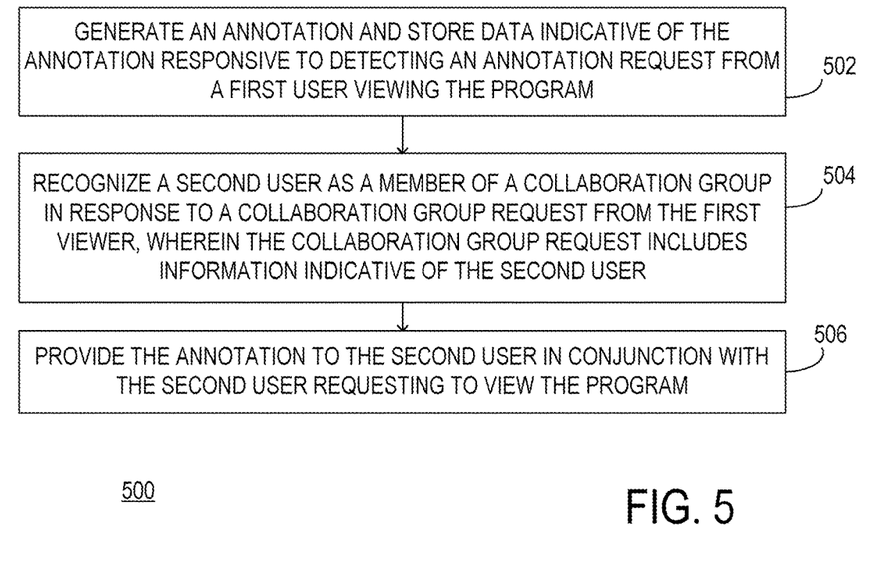
FIG. 5 is a flow diagram of selected elements of an embodiment of a collaborative annotation method.

Turning now to FIG. 5, a flow diagram depicts selected elements of a collaborative annotation method 500 suitable for use in a multimedia environment including the multimedia content delivery network 100 depicted in FIG. 1.

Method 500 may be performed or practiced by collaborative annotation application 330 (FIG. 3), another application hosted by application server 150 or another networked resource (not depicted) of multimedia content delivery network 100. In the embodiment depicted in FIG. 5, method 500 includes generating (block 502) an annotation and storing data indicative of the annotation in response to detecting an annotation request from a first user viewing the program. The annotation request may represent a request that is generated by MPR 124 in response to the user asserting an annotation button on remote control unit 128 or taking some other action for initiating an annotation, e.g., interacting with a user interface or other menu to initiate an annotation request.

Method 500 as depicted further includes recognizing (block 504) a second user as a member of a collaboration group in response to a collaboration group request from the first viewer. In some embodiments, users are enabled to create customized collaboration groups that include other users of multimedia content delivery network 100. In these embodiments, a first user may define a collaboration group by transmitting a collaboration group request where the request includes information that identifies or otherwise indicates one or more other users. Collaboration group members might be identified or indicated by, for example, their names, email addresses, street addresses, phone numbers, user identifications, personal identification numbers, and so forth.

Method 500 as depicted further includes providing (block 506) an annotation to the second user in conjunction with the second user requesting to view the program. In this embodiment, the first user may create an annotation and create a collaboration group that includes the second user. When the second user requests the program for viewing, the collaborative annotation application 330 or another application may inform the second user that the second user has been included in the first user's collaboration group. The application may then prompt the second user to determine if the second user consents to inclusion in the collaboration group. If the second user consents to inclusion in the collaboration group, collaborative annotation application 330 may then make the annotation data created by the first user accessible to the second user.

Figure 6:
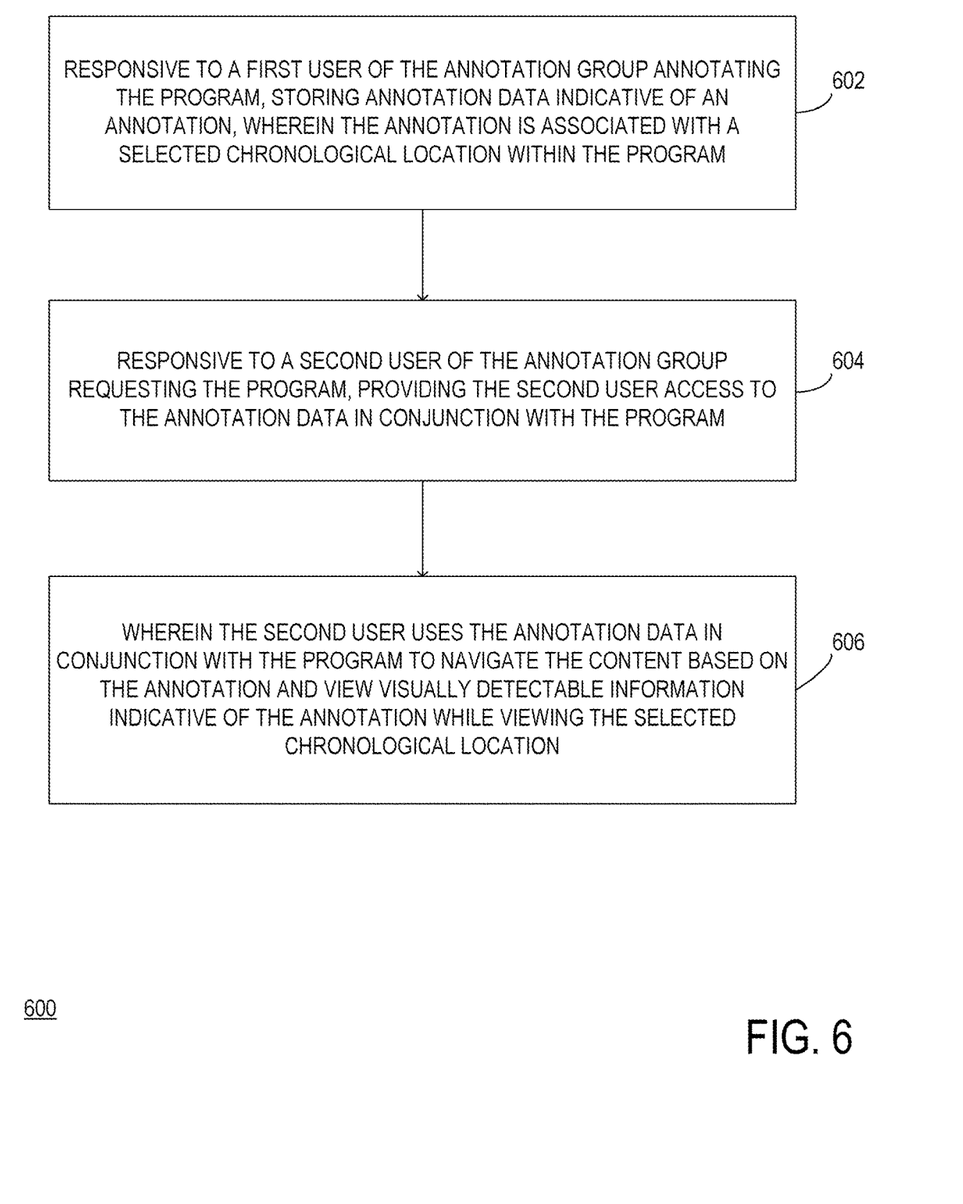
FIG. 6 is a flow diagram of selected elements of another embodiment of a collaborative annotation method.

Turning now to FIG. 6, selected elements of a collaborative annotation method 600 are depicted. Method 600 may be performed, at least in part, by collaborative annotation application 330. In the embodiment depicted in FIG. 6, method 600 includes storing (block 602) annotation data that represents or is indicative of an annotation that a first user has created for a particular program. The annotation data that is stored may include chronological information that is suitable for chronologically locating the annotation within the program. The annotation may be stored on a storage resource that is local to the first user or stored on a networked resource that is or may be accessible to multiple users.

Method 600 as depicted in FIG. 6 further includes providing (block 604) a second user with access to the stored annotation data in response to the second user requesting the program. The first and second users may be members of a common collaboration or annotation group. Membership of the group may be controlled by the user that creates the group using, for example, invitations to control group membership. In other embodiments, group membership may be open to any user that elects to become a member. In still other embodiments, access to annotation data is made available to all users or all users who subscribe to a collaboration service without regard to any collaboration groups. In these embodiments, annotations created by any user are made available within a database that is accessible only to those users who subscribe to the collaboration service.

Method 600 as depicted in FIG. 6 further includes enabling (block 606) the second user to access the annotation data while viewing the applicable program or otherwise in conjunction with the program. In some embodiments, block 606 of method 600 includes enabling the second user to navigate the program based on the annotations represented in the annotation data. The second user may, for example, be enabled to navigate to specific annotations explicitly. For example, the second user may be presented with an interactive display that lists all or some of the annotations associated with a program and prompts or permits the user to navigate to portions of the program associated with any of the listed annotations. Method 600 further encompasses alternative techniques of presenting the annotations to the second user. In one such alternative, method 600 may present the annotations to the second user in a visually detectable manner while the second user views the program. In these embodiments, for example, the second user's display may "pop up" a text-based annotation from the first user when the program, as it is being viewed by the second user, reaches the chronological point in the program corresponding to the annotation. In other embodiments, the visually detectable presentation of links may include displaying icons, avatars, or other representations of one or more users overlaying the program content so that, for example, an annotation may pop up or otherwise appear in association with one of the representations so the viewer of the program can associate an annotation with a particular user.

Figure 7:
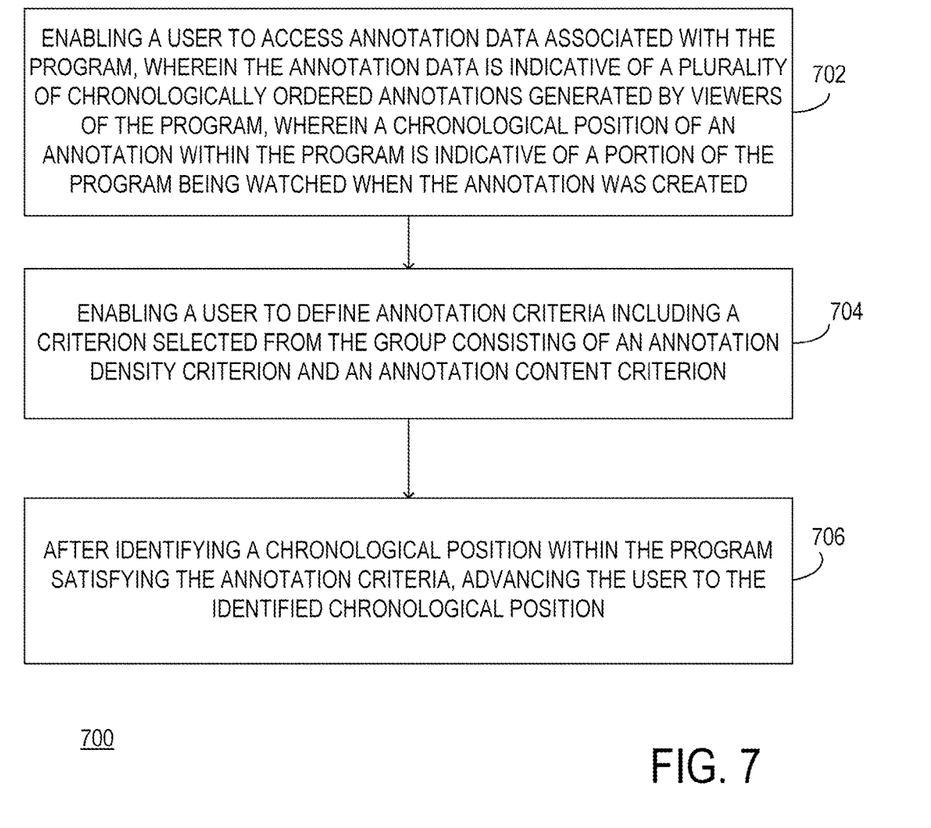
FIG. 7 is a flow diagram of selected elements of an embodiment of an annotation based navigation method.

Turning now to FIG. 7, a flow diagram depicts selected elements of an embodiment of a collaborative annotation service 700. Collaborative annotation service 700 may be performed by a provider of the multimedia content delivery services. Alternatively, collaborative annotation service 700 as shown may be performed by a third party to whom the multimedia content distribution service provider has outsourced responsibility for the service.

In the embodiment depicted in FIG. 7, collaborative annotation service 700 includes enabling (block 702) a user to access annotation data that corresponds to or is associated with a particular program. The annotation data associated with a program may include or represent information that is indicative of a plurality of user generated annotations. The annotations may be chronologically ordered and a chronological "position" of an annotation within a program may indicate, with a degree of precision that is implementation specific, a portion of the program that was being watched when the annotation was created.

Collaborative annotation service 700 as depicted in FIG. 7 further includes enabling (block 704) a user to define annotation criteria. The annotation criteria defined by the user may include an annotation density criterion, an annotation content criterion, as well as other types of criteria. The annotation density criterion may be used to identify locations within the program where the number of annotations exceeds a specified density in terms of annotations per unit time. Annotation content criterion encompasses any type of criterion in which the criterion may be examined or selected based on its content. In either case or in the case of any other type of annotation criteria, the criteria may be used for navigational purposes by identifying locations within the program where the annotations meet or exceed a specified criterion. Taking the case of an annotation density criterion, for example, a user may invoke the enhanced navigation services to identify portions of a program where a large amount of interest, as measured by the occurrence of annotations, is exhibited.

Collaborative annotation service 700 as shown supports enhanced user-navigation of the program by advancing (block 706) the user to a chronological location within the program that satisfies the annotation criteria. For example, a user may be interested in finding or otherwise navigating to a location within the program where there are a large number of annotations. To find any such locations, the user may specify an annotation density criteria of N annotations/minute. In this case, the collaborative annotation application 330 may then search the annotation data and determine, from chronological information associated with each annotation or by other techniques, one or more locations in the program where there are N or more annotations within a 60 second window. In some embodiments, the collaborative annotation application would then display the program, if the program is not already being displayed, and advance the program to one of the locations identified as satisfying the specified criteria. In some instances, the application may advance the user to the first encountered location satisfying the criteria while, in other instances, the application may advance the user to the location that has the greatest annotation density or to another location that satisfies the criteria.

Figure 8:
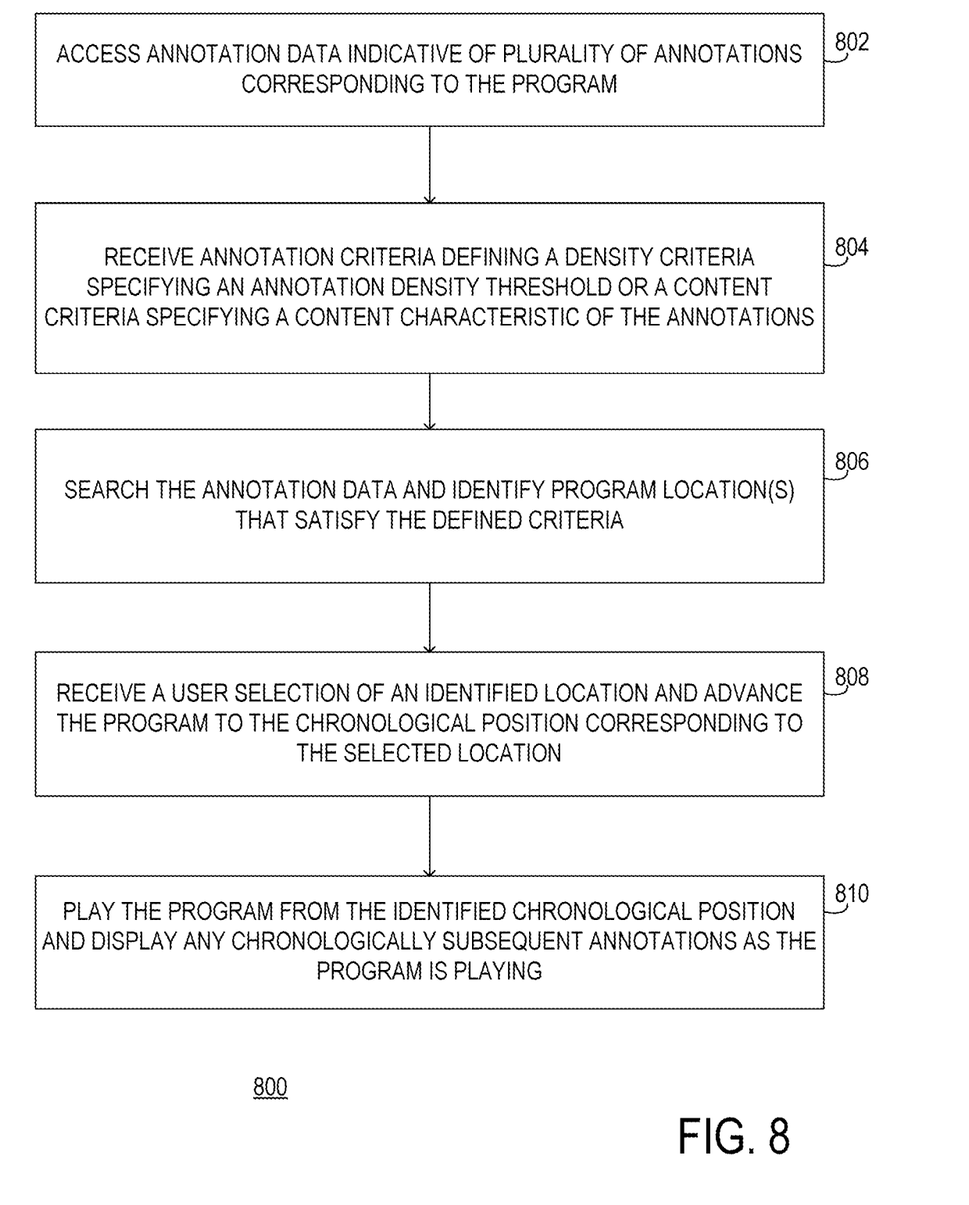
FIG. 8 is a flow diagram of selected elements of another embodiment of an annotation based navigation method.

Referring now to FIG. 8, a block diagram illustrates selected elements of an embodiment of a method 800 for navigating an annotated multimedia program, e.g., a multimedia program that is associated with annotation data as described herein. In some embodiments, method 800 represents a navigation method performed by collaborative annotation application 330 or by enhanced navigation application 218. In the depicted embodiment, method 800 includes accessing (block 802) annotation data corresponding to a particular program of interest to a viewer or other user. As described previously, the annotation data contains annotations, or data indicative of annotations, including information indicating annotation content, e.g., text, image, etc., information indicating a chronological position of the annotation within the program, and, at least in some embodiments, information indicating the author or source of an annotation. The accessing of annotation data may occur in response to a user selecting an annotated program for viewing.

The depicted embodiment of method 800 further includes receiving (block 804) user specified information indicating an annotation criteria. The annotation criteria as described above may, in some embodiments, include an annotation density criteria that specifies an annotation density threshold value or an annotation content criteria specifying one or more characteristics of the annotation content. The user may be enabled to specify annotation criteria using the remote control and a graphical interface presented on the display screen.

Method 800 as depicted in FIG. 8 may further include searching (block 806) the annotation data and/or the program using the annotation criteria to identify one or more locations within the program that satisfy the annotation criteria. In some embodiments, the enhanced navigation application 218 may search the entire program and identify all locations within the program that satisfy the criteria. Alternatively, the application may search the program and identify a subset of the locations that satisfy the criteria. For example, the application may identify just the "next-in-time" location that satisfies a criteria. The number of criteria-satisfying locations within the program to be identified and displayed is an implementation specific detail and other implementations may identify and/or display more or fewer criteria-satisfying locations of the program.

Method 800 may further include receiving (block 808), from the viewer or other user, a selection of at least one of the criteria-satisfying program locations identified in block 806 and presenting the user with an option to advance the program to a selected location within the program. In response to receiving, from the user, a request or confirmation to advance the program, method 800 as shown in FIG. 8 may include playing (block 810) the program from the selected program location. The playing of the program in block 810 may include displaying any subsequently occurring annotations while the program is playing. Program annotations may be displayed in various techniques referred to previously.

Figure 9:
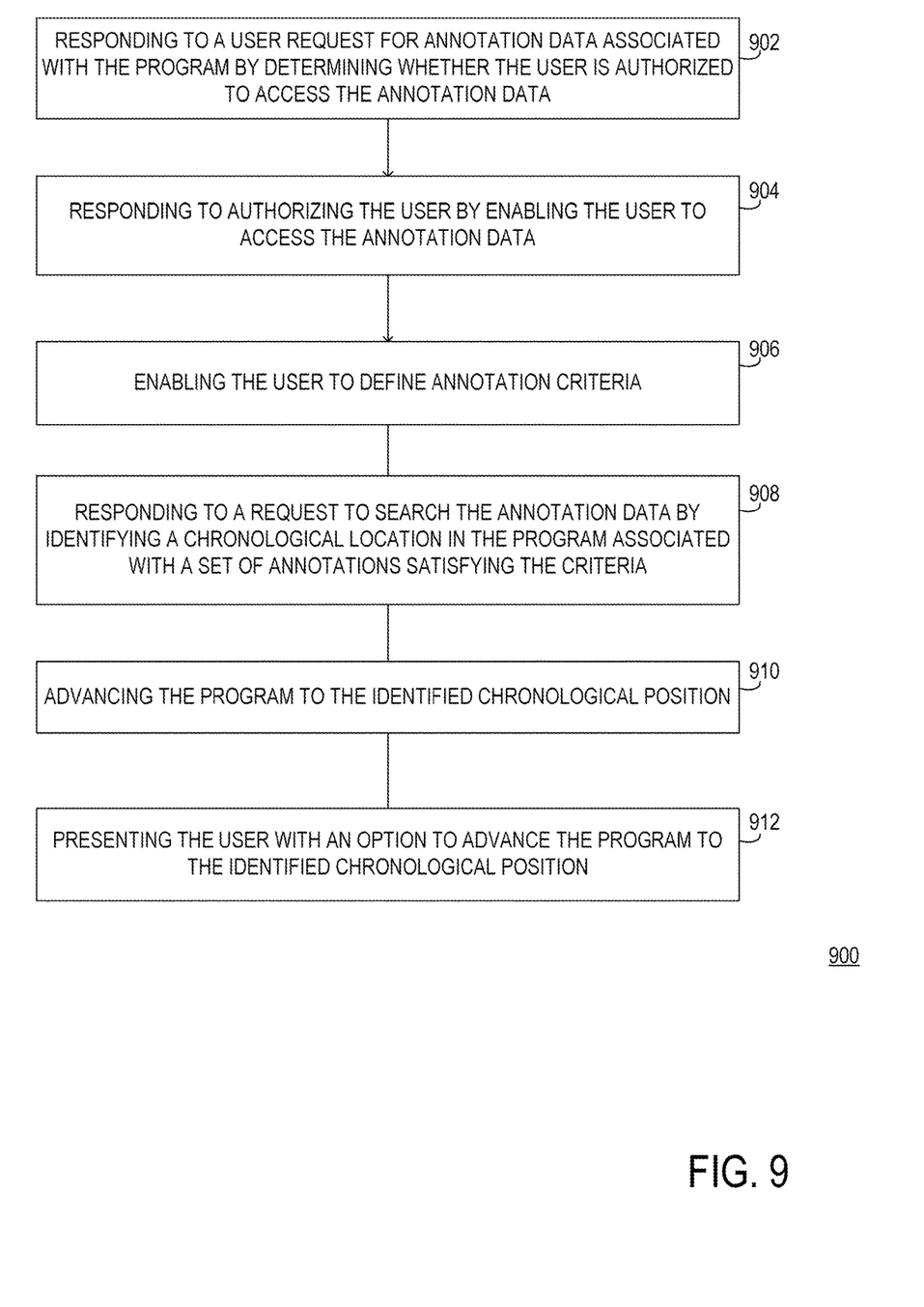
FIG. 9 is a flow diagram of selected elements of another embodiment of an annotation based navigation method.

Turning now to FIG. 9, selected elements of an embodiment of a collaborative application method 900 are depicted. Method 900 may be performed, in some embodiments, by enhanced navigation application 218. As depicted in FIG. 9, method 900 includes determining (block 902), in response to a user request for annotation data that is associated with a multimedia program, whether the requesting user is authorized to access the requested annotation data. The authorization represented by block 902 may be defined by another user such as when a user defines a collaboration group. The authorization may also be defined by a system administrator when, for example, the only requirement to access a particular annotation data is subscription to a collaborative annotation service offered by a service provider.

If the user requesting access to annotation data is determined to be an authorized requester, method 900 includes enabling (block 904) the user to access the annotation data and enabling (block 906) the user to define annotation criteria. Enabling the user to define annotation criteria may include, for example, presenting the user with an annotation defining user interface via which the user can specify annotation criteria with a remote control device.

Method 900 may further include, in response to detecting a user request to search annotation data, identifying (block 908) a chronological location in the program where the annotation criteria are met, presenting (block 910) the user with an option to advance the program to the identified chronological position, and, responsive to a user request or input, advancing (block 912) the program to the identified chronological position and playing the program from the identified position. In this manner, method 900 permits a user to navigate within a program based on annotations that have been associated with the program.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:
1. A data processing system comprising:
   a processor; and
   a computer readable storage medium accessible to the processor and including processor executable instructions that, when executed by the processor, cause the processor to perform operations including:

generating annotation data indicative of an annotation responsive to detecting an annotation request from a first user viewing a program wherein the annotation includes a rating indicating either an approval or disapproval of proximal content, wherein the proximal content comprises content within a time period to the chronological location of the annotation;

receiving, from the first user, a collaboration group request indicative of a first collaboration group defined by the first user, wherein the first collaboration group includes a second user and wherein the collaboration group request includes information indicative of the second user;

maintaining first group data including first collaboration group annotations created by any member of the first collaboration group;

receiving, from the second user, a compound annotation criteria including first and second annotation criterion, wherein satisfaction of the first annotation criterion requires an approval density exceeding a threshold density and wherein satisfaction of the second annotation criterion requires a disapproval density exceeding the threshold density, wherein the approval density indicates a density of ratings approving the content and wherein the disapproval density indicates a density of ratings disapproving the content and further wherein satisfaction of the compound annotation criteria indicates proximal content satisfying the first annotation criterion and the second annotation criterion simultaneously;

identifying chronological locations in the program satisfying the compound annotation criteria;

receiving, from the second user, a navigation request indicating a particular one of the chronological locations identified; and responsive to the navigation request from the second user, navigating to the particular one of the chronological locations identified.

2. The system of claim 1, wherein navigating to the particular one of the chronological locations comprises navigating to a first encountered of the chronological locations identified.

3. The system of claim 1, wherein detecting the annotation request includes:
detecting the first user asserting an annotation button on a remote control device while the first user is viewing the program.

4. The system of claim 1, wherein the annotation criteria further include an annotation content criterion indicating an aspect of content in the program.

5. A method supporting collaborative annotations for a program of multimedia content, wherein the annotations are shared by a plurality of users in an annotation group, the method comprising:
receiving, from a first user, a collaboration group request indicative of a first collaboration group defined by the first user, wherein the first collaboration group includes a second user and wherein the collaboration group request includes information indicative of the second user;

responsive to an annotation request from the first user annotating a program, generating, by an application server, annotation data indicative of an annotation, wherein the annotation is associated with a selected chronological location within the program and further wherein the annotation includes rating indicative of either an approval or disapproval of proximal content, wherein the proximal content comprises content within a time period to the chronological location of the annotation;

maintaining first group data including first collaboration group annotations created by any member of the first collaboration group;

responsive to the second user requesting the program, providing, by the application server, the second user access to the first group data;

receiving, from the second user, a compound annotation criteria including first and second annotation criterion, wherein satisfaction of the first annotation criterion requires an approval density exceeding a threshold density and wherein satisfaction of the second annotation criterion requires a disapproval density exceeding the threshold density, wherein the approval density indicates a density of ratings approving the content and wherein the disapproval density indicates a density of ratings disapproving the content and further wherein satisfaction of the compound annotation criteria indicates proximal content satisfying the first annotation criterion and the second annotation criterion simultaneously;

identifying chronological locations in the program satisfying the compound annotation criteria;

receiving, from the second user, a navigation request; and responsive to the navigation request from the second user, navigating to a particular one of the chronological locations identified.

6. The method of claim 5, wherein the annotation includes an image indicative of a frame of the program displayed when the user annotated the program.

7. The method of claim 5, wherein the annotation includes content selected by the first user from: text, an audio segment, an image, and a video segment.

8. The method of claim 5, wherein navigating to the particular one of the chronological locations comprises navigating to a first encountered of the chronological locations identified.

9. The method of claim 5, further comprising, generating the annotation request responsive to the first user asserting an annotation button on a remote control device.

10. The method of claim 5, wherein creating the annotation includes creating a chat annotation including text generated by the first user.

11. The method of claim 5, wherein the particular annotations comprise the disapproval rating annotations.

12. A collaborative annotation method, comprising:
receiving, from a first user, a collaboration group request indicative of a first collaboration group comprising a plurality of users defined by the first user, wherein the first collaboration group includes a second user and wherein the collaboration group request includes information indicative of the second user;

maintaining first group data including first collaboration group annotations created by any member of the first collaboration group, wherein each of the first collaboration group annotations includes a rating indicating either an approval or disapproval of proximal content, wherein the proximal content includes content within a time period to the chronological location of the annotation;

receiving, from the second user, a compound annotation criteria including first and second annotation criterion, wherein satisfaction of the first annotation criterion requires an approval density exceeding a threshold density and wherein satisfaction of the second annotation criterion requires a disapproval density exceeding the threshold density, wherein the approval density indicates a density of ratings approving the content and wherein the disapproval density indicates a density of ratings disapproving the content and further wherein satisfaction of the compound annotation criteria indicates proximal content satisfying the first annotation criterion and the second annotation criterion simultaneously;

identifying chronological locations in the program satisfying the compound annotation criteria;

receiving, from the second user, a navigation request; and responsive to the navigation request, advancing the program of multimedia content to a particular one of the chronological locations identified.

13. The method of claim 12, further comprising, enabling a third user to define the plurality of users.

14. The method of claim 12, further comprising enabling the first user to navigate the program of multimedia content by the annotations.

15. The method of claim 12, further comprising enabling the first user to send the annotation to a selected recipient for use in viewing the content.

16. A method, comprising:

generating annotation data responsive to detecting an annotation request from a first user viewing a program wherein the annotation data is indicative of an annotation and a rating, wherein the rating indicates either an approval or disapproval of proximal content, wherein the proximal content includes content within a time period to the chronological location of the annotation;

receiving, from the first user, a collaboration group request indicative of a first collaboration group defined by the first user, wherein the first collaboration group includes a second user and wherein the collaboration group request includes information indicative of the second user;

maintaining first group data including first collaboration group annotations created by any member of the first collaboration group;

receiving, from the second user, a compound annotation criteria including first and second annotation criterion, wherein satisfaction of the first annotation criterion requires an approval density exceeding a threshold density and wherein satisfaction of the second annotation criterion requires a disapproval density exceeding the threshold density, wherein the approval density indicates a density of ratings approving the content and wherein the disapproval density indicates a density of ratings disapproving the content and further wherein satisfaction of the compound annotation criteria indicates proximal content satisfying the first annotation criterion and the second annotation criterion simultaneously;

identifying chronological locations in the program satisfying the compound annotation criteria;

receiving, from the second user, a navigation request indicating a particular one of the chronological locations identified;

responsive to the navigation request from the second user, navigating to the particular one of the chronological locations identified.

17. The method of claim 16, wherein the annotation includes an image indicative of the content displayed when the first user generated the annotation request.

18. The method of claim 16, wherein the annotation includes content selected from: text, an audio segment, an image, and a video segment.

19. The method of claim 16, wherein the annotations include chronological information indicative of a chronological location within the program.

* * * * *